US008008081B1

(12) United States Patent
McCormick et al.

(10) Patent No.: US 8,008,081 B1
(45) Date of Patent: Aug. 30, 2011

(54) DATA PROCESSING SYSTEM FOR PROVIDING AN EFFICIENT MARKET FOR SPECIALTY CHEMICALS

(75) Inventors: Christopher Charles McCormick, Madison, NJ (US); Christopher John Charles Whiston, Weehawken, NJ (US)

(73) Assignee: DeMont & Breyer, LLC, Holmdel, NJ (US)

( * ) Notice: Subject to any disclaimer, the term of this patent is extended or adjusted under 35 U.S.C. 154(b) by 3054 days.

(21) Appl. No.: 09/668,688

(22) Filed: Sep. 23, 2000

(51) Int. Cl.
*G06Q 50/00* (2006.01)
(52) U.S. Cl. ........ 436/50; 705/26.81; 705/26.8; 702/30; 702/32; 422/68.1; 700/266
(58) Field of Classification Search .................... 705/26, 705/37; 436/8, 55, 183
See application file for complete search history.

(56) References Cited

U.S. PATENT DOCUMENTS

| 5,940,807 | A * | 8/1999 | Purcell ............................. | 705/26 |
| 6,882,980 | B1 * | 4/2005 | Schuller ......................... | 705/26 |
| 2003/0014318 | A1 * | 1/2003 | De La Motte et al. .......... | 705/26 |

OTHER PUBLICATIONS www.mdli.com, "MDL Introduces Reagent Selector to Streamline Reagent Selection/Procurement for High-Throughput Chemistry" May 5, 1999.*
http://webbook.nist.gov, "NIST WebBook" Apr. 29, 1999.*
The Available Chemicals Directory, MDL Information Systems, Inc., 1999.*
ConsumerReports.org home page.*
ConsumersUnion.org Mission Statement.*

* cited by examiner

*Primary Examiner* — P. Kathryn Wright

(57) ABSTRACT

A data processing system that facilitates the buying and selling of specialty chemicals. A uniform standard and specification is established for each specialty chemical that is being offered for sale via the system. The uniform standard and specification is advantageously supplier independent so that a prospective purchaser can directly compare offerings from different suppliers. A prospective purchaser defines a requirement for a specialty chemical that it wishes to purchase. The requirement, which defines acceptable ranges for the characteristics that make up the standard, is input into the data processing system. The requirement is compared, in the data processing system, with analyses of batches of the specialty chemical that are available for purchase through the data processing system in an attempt to find a batch that satisfies the requirement. An indicium of a batch satisfying the requirement is output, from the data processing system, to the prospective purchaser.

19 Claims, 6 Drawing Sheets

DATA PROCESSING SYSTEM FOR PROVIDING AN EFFICIENT MARKET FOR SPECIALTY CHEMICALS

FIELD OF THE INVENTION

The present invention relates to electronic commerce in general, and, more particularly, to a data processing system that provides an efficient market for the purchase and sale of specialty chemicals.

BACKGROUND OF THE INVENTION

The chemical industry traditionally divides the market for the sale of chemicals into: (i) bulk chemicals, and (ii) specialty chemicals. Bulk chemicals are typically manufactured using a continuous-flow process, and the process is continually monitored and adjusted to ensure that the resulting product has the desired chemical and physical characteristics. In contrast, specialty chemicals are typically manufactured in discrete batches, and although suppliers desire that the chemical and physical characteristics of the resulting product are identical from batch to batch, variations do occur. Typically, such variability is evaluated using a "standard" and a "specification."

Typically, a supplier or manufacturer (hereinafter collectively "supplier") establishes a standard for each specialty chemical that it sells. For the purposes of this disclosure, the "standard" for a specialty chemical is defined as the set of chemical and physical characteristics that are used to describe that specialty chemical. Typically, although not necessarily, a standard is based on the empirical measurements of a sample of a previously-manufactured chemical. Illustrative chemical and physical characteristics include, but are not limited to, hue rating, dichroism rating, dispersion rating, lightness rating, impurities concentrations, etc. Often, the standard for any given specialty chemical comprises over one hundred different chemical and physical characteristics.

To further evaluate the variability of discrete batches, the supplier establishes a "specification." For the purposes of this disclosure, the "specification" for a specialty chemical is defined as the nominal range for each chemical and physical characteristic listed in the standard. Typically, an upper limit and a lower limit for each chemical and physical characteristic is provided in the specification.

There is usually more than one testing method that can be used to evaluate any particular chemical and physical characteristic of a specialty chemical. Furthermore, it is not atypical for such testing methods to use different scales or bases for evaluating the characteristic. Moreover, testing methods have, in certain cases, idiosyncrasies that tend to skew the data. Because the testing method used typically affects the empirical data obtained for a chemical or physical characteristic, the specification for each chemical and physical characteristic that is evaluated is associated with a testing method. Table 1 depicts a portion of the standard and specification for an illustrative specialty chemical, "Specialty Chemical A."

TABLE 1

| For Specialty Chemical A | | | |
|---|---|---|---|
| Standard | | Specification | |
| Characteristic | Test Method | Upper Limit | Lower Limit |
| Dichroism Rating | Method 1 | 3 MD | 3 LD |
| Dichroism Rating | Method 2 | 3.5 MD | 2.5 LD |
| Lightness Rating | Method 3 | 3 H | 3 D |
| Purity Rating | Method 4 | 3 P | 3 T |
| Hue Rating | Method 5 | 3 Y | 3 B |
| Color Strength Rating | Method 6 | 2+ | 2− |
| PH | Method 7 | 9.5 | 6.5 |
| Arsenic content, ppm | Method 8 | 50 | |
| Chromium content, ppm | Method 9 | 100 | |
| Mercury content, ppm | Method 10 | 25 | |

The supplier evaluates each batch in accordance with the standard for that specialty chemical and relative to its specification. In other words, a sample of each such batch is tested to obtain a measurement of each chemical and physical characteristic listed in the standard and using the appropriate testing method listed in the specification. Using the empirical data gathered from such tests and the upper and lower limits listed in the specification, the supplier then declares whether the batch is "in-specification" or "out-of-specification" as to each chemical and physical characteristic. Thus, a supplier establishes a standard and specification for each specialty chemical that it manufactures and/or sells and evaluates each batch of specialty chemical relative to the appropriate standard and specification. This approach provides the supplier and a prospective purchaser with a means for evaluating the variation in, and suitability of, each batch of each specialty chemical.

This technique is, however, disadvantageous.

Many consumers of specialty chemicals would prefer to have multiple sources from which to buy their specialty chemicals because it gives them the opportunity to price shop and also because it gives them an secondary source for their specialty chemicals. But comparing the offerings of a single specialty chemical from multiple suppliers is problematic because it is the supplier, and not the purchaser, that sets the standard and specification for its products. And the standards and specifications established by any one specialty chemical supplier for its products are almost always different from those established by other suppliers.

This problem is illustrated in FIG. 1A, wherein prospective purchaser 106-1, who is interested in specialty chemical A, considers purchasing specialty chemical A from three different suppliers, suppliers 104-1, 104-2, and 104-3.

Each of the suppliers analyzes the batches of specialty chemicals that they produce in their own laboratories. In particular, as illustrated in FIG. 1, supplier 104-1 analyzes its samples in its laboratory or test facility 107-1, supplier 104-2 analyzes its samples in its test facility 107-2 and supplier 104-3 tests its samples in test facility 107-3.

Supplier 104-1 analyzes its batches of specialty chemical A using standard 1 and specification 1. Analogously, supplier 104-2 uses standard 2 and specification 2, and supplier 104-3 uses standard 3 and specification 3. Table 2 depicts the standard and testing method that each of the three suppliers uses for specialty chemical A.

TABLE 2

Standards and Testing Methods For Specialty Chemical A

| Standard | Supplier 104-1 Used? | Test Method | Supplier 104-2 Used? | Test Method | Supplier 104-3 Used? | Test Method |
|---|---|---|---|---|---|---|
| Dichroism Rating | Yes | 1 | Yes | 2 | Yes | 1 |
| Lightness Rating | Yes | 3 | Yes | 3 | No | N/A |
| Purity Rating | Yes | 4 | No | N/A | Yes | 5 |
| Hue Rating | No | N/A | Yes | 6 | Yes | 6 |
| PH | Yes | 7 | Yes | 8 | Yes | 9 |

It can be seen from TABLE 2 that suppliers 104-1, 104-2 and 104-3 use different standards. In particular, supplier 104-1 does not measure hue rating, supplier 104-2 does not measure purity rating, and supplier 104-3 does not measure lightness rating. Moreover, to the extent that the various suppliers are measuring the same characteristic, they are, in some cases, using different testing methods for evaluating the characteristics. For example, suppliers 104-1 and 104-3 use method "1" to measure dichroism, but supplier 104-2 uses a different method. As stated above, even though testing method #1 and #2 are intended to measure the same chemical or physical characteristic, the two testing methods are likely to indicate different values, and, therefore, comparing the results of testing method #1 to testing method #2 is like comparing apples to oranges.

As a consequence, prospective purchaser 106-1 might have difficulty comparing the batches of specialty chemical A offered by the three suppliers. Furthermore, prospective purchaser 106-1 might have some reservations about the objectivity of the test results because each supplier tests its own products. One solution to this problem is provided by third-party testing facilities (e.g., www.worldwidetesting.com, etc.) that offer buyers and sellers the benefit of independent (i.e., objective) testing.

The service provided by a third-party testing facility is depicted in FIG. 1B. As depicted in FIG. 1B, the chemical and physical tests are performed by third-party testing facility 107, which is not owned or otherwise associated with suppliers 104-1, 104-2 and 104-3. Although FIG. 1 depicts only one third-party testing facility, in practice there are many more such testing facilities in existence.

Although third-party testing facilities overcome the problem of the objectivity of test results, prospective purchasers are still faced with the problem of how to directly compare product offerings from different suppliers.

Therefore, the need exists for techniques that enable prospective purchasers to compare specialty chemical offerings from different suppliers.

SUMMARY OF THE INVENTION

The present invention is a data processing system and method for facilitating the sale of specialty chemicals that avoids some of the costs and disadvantages of techniques in the prior art.

In particular, some embodiments of the present invention establish a uniform standard and specification for each specialty chemical that is being offered for sale via the embodiment. The uniform standard and specification is advantageously supplier independent, and advantageously encompasses most, if not all, of the standards used by the individual suppliers. Consequently, one standard and one specification are advantageously established for each specialty chemical. In this manner, the present invention benefits a prospective purchaser by facilitating a direct comparison of offerings from different suppliers.

Although this is clearly advantageous for purchasers of specialty chemicals, it is also advantageous for the suppliers of specialty chemicals because it enables them to sell non-branded products, and to sell branded products as unbranded. This is advantageous because it provides the supplier of a branded specialty chemical with an alternative marketing/sales channel that does not affect the branded specialty chemical. Furthermore, the supplier can sell the branded specialty chemical as unbranded through embodiments of the present invention at substantial discounts without offending the traditional customers of its branded product.

For example, a situation might arise when a supplier of specialty chemicals has excess inventory of a specialty chemical. To sell such inventory quickly, the supplier might be willing to price the excess specialty chemical below its normal selling price. If a customer of the supplier who had paid the normal price for that specialty chemical learned of this sale, problems would almost certainly arise.

One way to avoid this complication is to sell the excess inventory as a "unbranded" chemical. In other words, the specialty chemical is not identified as being manufactured by the supplier nor is it sold under its trademark. But to what standard and specification does the supplier reference the specialty chemical? If the standard and the specification that it normally used to characterize that specialty chemical are used with the non-branded material, the supplier risks being identified. The illustrative embodiment, wherein a uniform standard and specification is established for each specialty chemical, enables the manufacture to sell its branded products as unbranded, at steep discounts, without compromising itself as the supplier.

In accordance with the present teachings, a sample of each batch of specialty chemical that is available for purchase through the data processing system is analyzed by an independent testing facility, in accordance with the uniform standard established for the chemical. The test results are input into the data processing system and, in some embodiments, are organized into an inventory database. A prospective purchaser patronizing the data processing system establishes a requirement for the specialty chemical that it wishes to purchase. The requirement defines acceptable ranges for the measured values of at least some of the chemical and physical characteristics in the applicable uniform standard.

After the prospective purchaser enters its requirement into the data processing system, the data processing system searches the inventory database in an attempt to identify batches of the specialty chemical for sale that satisfy the purchaser's requirement. If any batches of the specialty chemical are identified that satisfy the purchaser's requirement, then that is reported to the prospective purchaser so that it can purchase the batch through the data processing system.

The illustrative embodiment of the present invention comprises: receiving, at a data processing system, a requirement for a specialty chemical from a prospective purchaser; matching, in the data processing system, the requirement to the results of analyses performed on batches of the specialty chemical available for purchase through the data processing system to identify a batch that satisfies the requirement; and outputting, from the data processing system, an indicium of the batch to the prospective purchaser.

In some embodiments of the present invention, information concerning the purchasing activity of patrons of the data processing system is advantageously compiled. Such information might be valuable to suppliers, among others entities, and is advantageously offered (e.g., for sale, etc.) to interested parties.

DETAILED DESCRIPTION

Figure 1A:
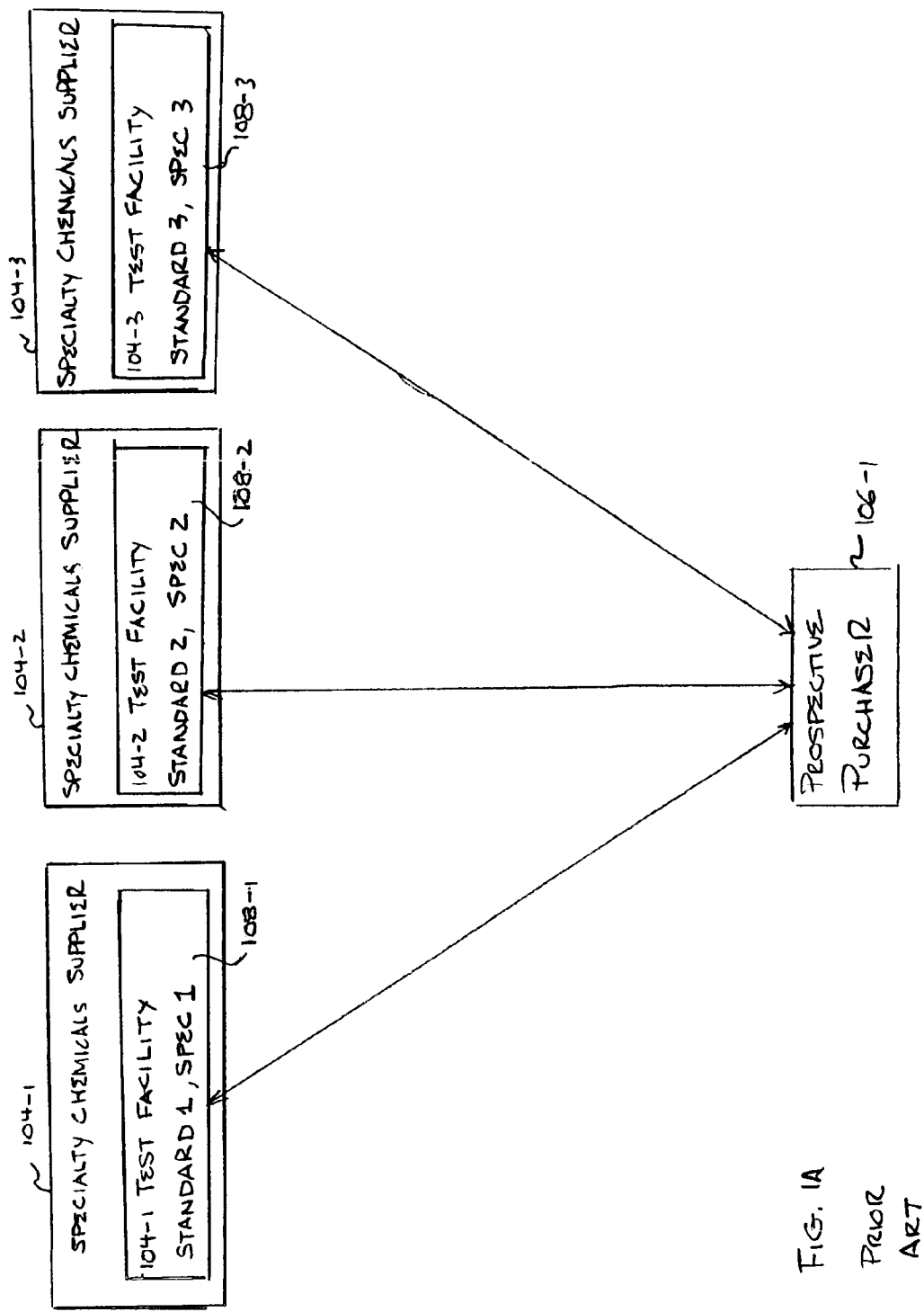
FIG. 1A depicts a typical interaction, in the prior art, between suppliers of specialty chemicals and a prospective purchaser preliminary to the sale/purchase of a specialty chemical.
Figure 1B:
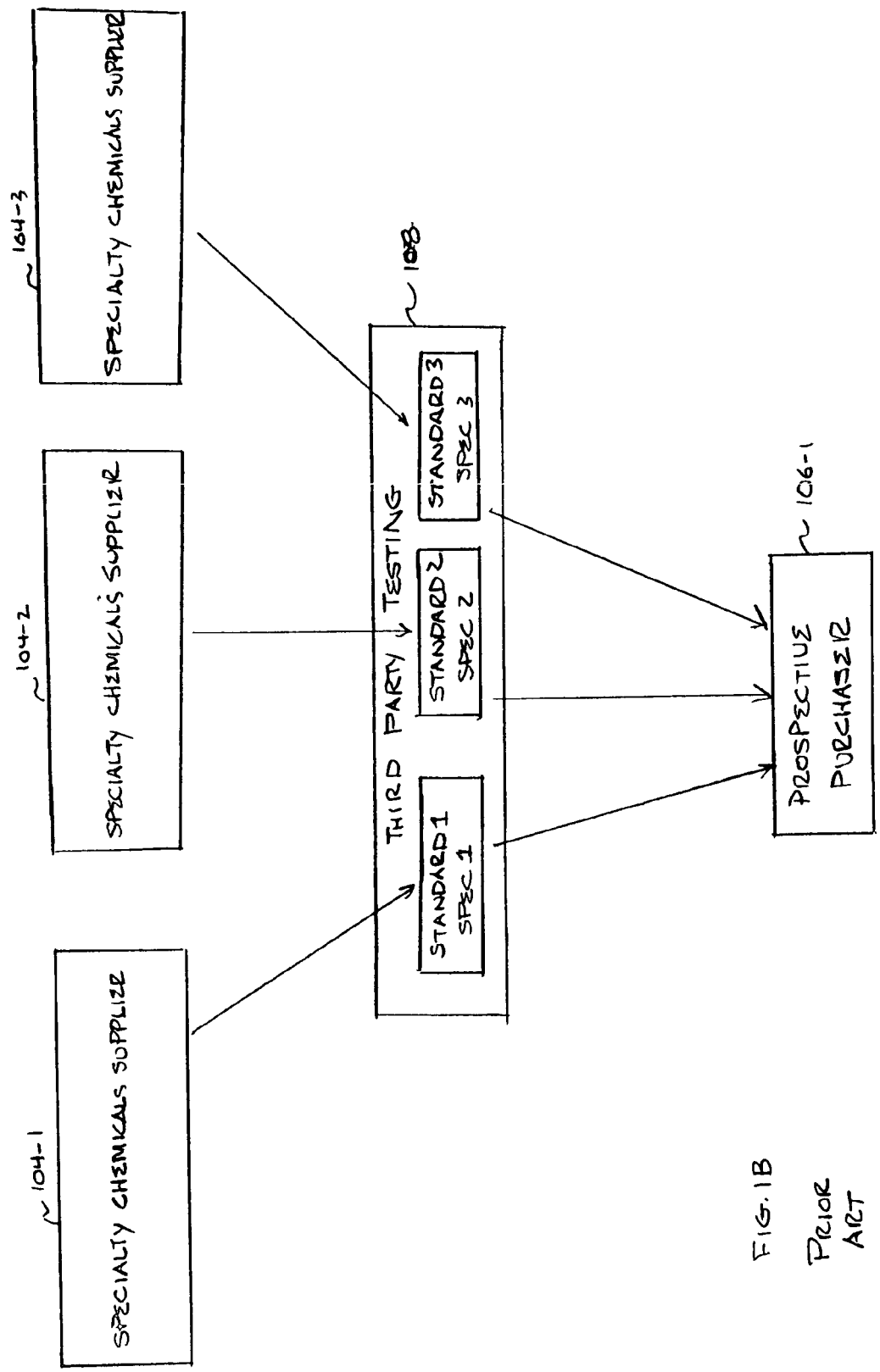
FIG. 1B depicts an interaction, via a prior art e-commerce site, between suppliers of specialty chemicals and a prospective purchaser preliminary to the sale/purchase of a specialty chemical.
Figure 2:
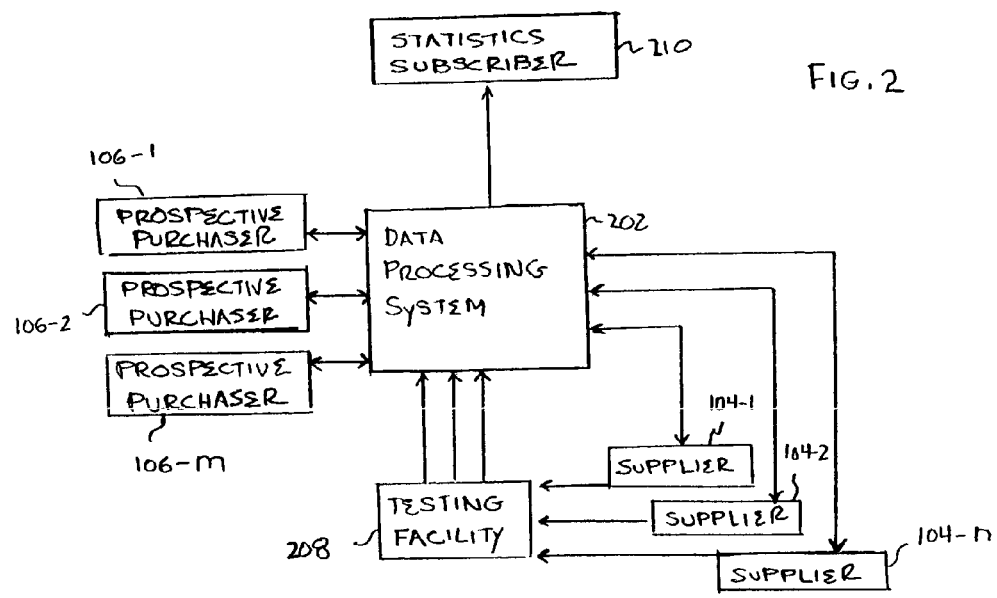
FIG. 2 depicts a schematic diagram of the illustrative embodiment of the present invention.

FIG. 2 depicts a schematic diagram of the illustrative embodiment of the present invention in which data processing system 202 provides a market for the purchase and sale of specialty chemicals. The specialty chemicals, which are being sold by a plurality of suppliers, suppliers 104-1 through 104-n, may be purchased by a plurality of prospective purchasers 106-1 through 106-m.

The heart of the illustrative embodiment is data processing system 202 that:

receives data from one or more testing facilities 208 that test, according to a uniform standard and testing methods, samples of batches of specialty chemicals that are provided by specialty chemicals suppliers 104-1 through 104-n;

stores the empirical testing data in an inventory database;

receives requirements data from prospective purchaser 106-1, etc., concerning a specialty chemical that it wishes to purchase;

attempts to identify, using the inventory database, at least one batch of specialty chemical that satisfies the requirements data of the prospective purchaser; and facilitates a sale of the identified batch by advising the prospective purchaser of the existence of the identified batch.

Some of the information that is input into and/or is generated by data processing system 202 might be valuable. For example, specialty chemicals suppliers 104-1 through 104-n might have an interest in, and might be willing to pay for, information about the purchasing activity of other patrons of the present invention.

Consequently, in some embodiments of the present invention, information (hereinafter "statistics") is offered (e.g., for purchase, etc.) to interested parties, which may include specialty chemicals suppliers and/or others (hereinafter collectively referred to as "statistics subscribers" 210).

Overview of Data Processing System Operations and Communications

Each prospective purchaser and specialty chemicals supplier is advantageously capable of providing data to and receiving data from data processing system 202 via a data network (e.g., the Internet, etc.) or via a telephone network (e.g., the Public Switch Telephone Network, etc.) or both. Moreover, any testing facility 208 that is not co-located with data processing system 202 (hereinafter a "remote testing facility"), advantageously communicates with data processing system 202 via a data network or via a telephone network or both.

Figure 3:
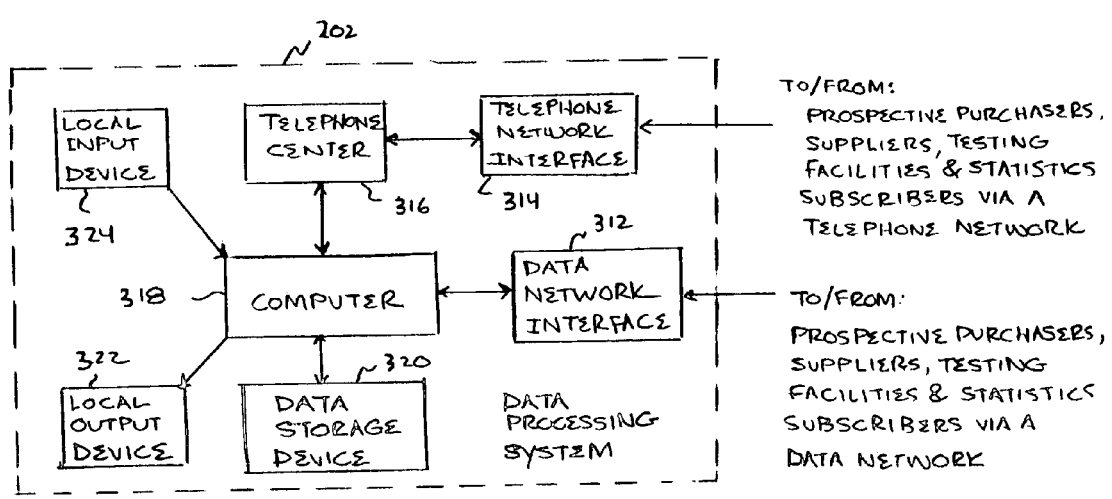
FIG. 3 depicts a block diagram of data processing system 202 depicted in FIG. 2.

FIG. 3 depicts an illustrative embodiment of data processing system 202, which comprises: data network interface 312, telephone network interface 314, telephone center 316, computer 318, data storage device 320, local output device 322 and local input device 324.

Data network interface 312 enables prospective purchasers, suppliers, testing facilities and statistics subscribers to communicate with data processing system 202 via a data network, such as the Internet. For example, data processing system 202 can be accessed via the World Wide Web.

Alternatively, prospective purchasers, suppliers, testing facilities and statistics subscribers can communicate with data processing system 202 via telephone, such as through a toll-free "800" number. To this end, telephone network interface 314 advantageously comprises one or more telephones that are capable of receiving calls from and placing calls to prospective purchasers, testing facilities and statistics subscribers. Telephone network interface 314 can further comprise an automatic call distribution system, in well-known fashion, for routing incoming calls to the various telephones. Furthermore, telephone network interface 314 is advantageously capable of receiving information from prospective purchasers, suppliers, testing facilities and statistics subscribers via a touch-tone interface wherein the parties input information into the system by pushing the buttons on their telephones in response to queries from an automated operator.

Telephone center 316 advantageously comprises one or more computer terminals. The terminals are operated by personnel associated with telephone network interface 314 such that an operator (either human or automated) can shuttle data between computer 318 and prospective purchasers, suppliers, testing facilities or statistics subscribers that are in contact with data processing system 202 via telephone network interface 314.

Computer 318 is advantageously a general-purpose computer as is well-known in the art that is capable of:

receiving data from and outputting data to telephone center 316;

receiving data from and outputting data to data network interface 312;

executing one or more programs that are stored in data storage device 320;

storing data in and retrieving data from data storage device 320;

providing data to local output device 322; and receiving data from local input device 324.

Figure 4:
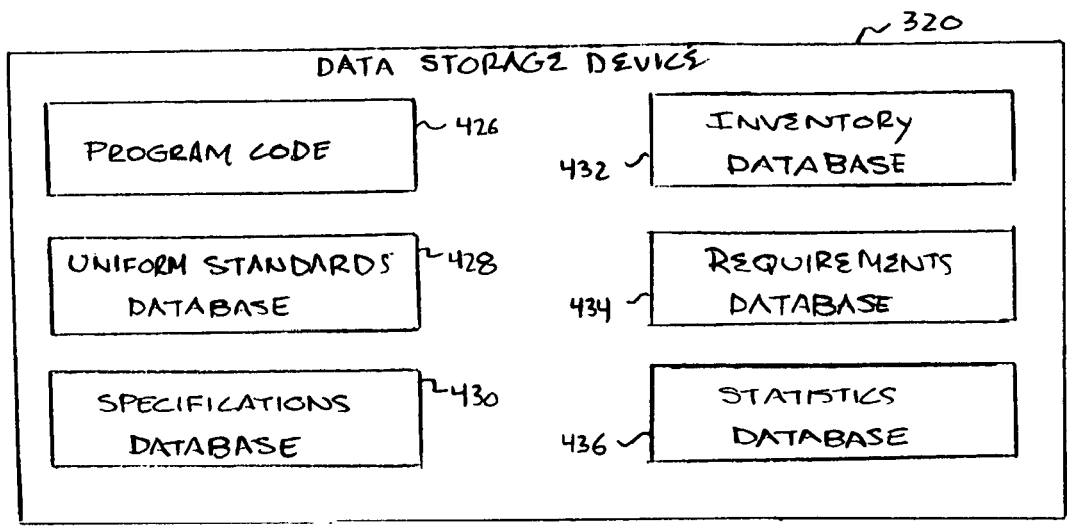
FIG. 4 depicts a block diagram of data storage device 320 depicted in FIG. 3.

Data storage device 320 is advantageously a non-volatile memory, such as a hard disk, for storing program code executed by computer 318 and for storing the data that is input into and generated by data processing system 202. More particularly, data storage device 320 advantageously comprises program code 426, uniform standards database 428, specifications database 430, inventory database 432, customer requirements database 434 and statistics database 436 (see FIG. 4.), all of which are described in more detail later in this disclosure.

Data from data processing system 202 is advantageously output to local output device 322 for delivery to suppliers, prospective purchasers and statistics subscribers. Local output device 322 can be, without limitation, a printer, a tape drive, removable hard disk (e.g., zip drive, etc.) or magneto-optical drive (e.g., DVD-ROM drive, etc.). Of course, the data can be output directly to data network interface 312 and routed, by the network, to the intended recipient if appropriate data transfer capabilities (e.g., high-speed data line) are available.

In embodiments of the present invention in which testing facility 208 is co-located near data processing system 202 (i.e., wherein it is physically located near computer 318), hereinafter referred to as a "local testing facility," local input device 324 is advantageously used to deliver data to data processing system 202. Local input device 324 can be, without limitation, any of the test equipment used at testing facility 208 (i.e., for testing samples of batches of specialty chemicals) that can generate a signal indicative of the test results. Such equipment will advantageously include an analog-to-digital ("A/D") converter, although an outboard A/D converter may suitably be used. A digital signal representative of the test results is thereby delivered to data processing system 202. Alternatively, test results can, of course, be manually input (i.e., via a terminal, etc.) to data processing system 202.

It will be clear to those skilled in the art how to make and use data network interface 312, telephone network interface 314, telephone center 316, computer 318, data storage device 320, local output device 322 and local input device 324. Although data processing system 202 is shown as including only one computer and one storage device, it will be understood that a data processing system in accordance with the present invention can also comprise two or more computers and two or more storage devices.

Establishing a Uniform Standard and Specification

The illustrative embodiment of the present invention establishes a uniform standard for each specialty chemical that is offered for sale via data processing system 202. As used in this disclosure, the term "uniform standard" is defined as a supplier-independent set of chemical characteristics or physical characteristics or both that are used to describe a chemical. Typically, although not necessarily, a uniform standard is based on the empirical measurements of a sample of a previously-manufactured chemical. Alternatively, a uniform standard can be based on the desires or needs of an entity without having first been manufactured.

The chemical and physical characteristics listed in a standard are typically indicative or predictive of a performance attribute of the specialty chemical, although there may be other reasons for including a particular chemical and physical characteristic. For instance, a chemical or physical characteristic may be included solely for historical reasons (i.e., because it has traditionally be reported). An example of chemical and physical characteristics include, without limitation, hue rating, dichroism rating, purity rating, transparency rating, impurities concentrations, etc. The uniform standard for any given specialty chemical will typically comprise many characteristics. The exact number for any given specialty chemical is a function of the specialty chemical itself and what prospective purchasers need and desire. Those skilled in the art will be able to develop a suitable set of chemical and physical characteristics for any given specialty chemical.

A variety of different testing methods may be available for measuring or evaluating any given chemical or physical characteristic. Such different testing methods might evaluate a given chemical and physical characteristic on a different basis (e.g., on a different scale, by a different measurement, etc.). Consequently, in addition to establishing a set of chemical and physical characteristics, specific testing methods are selected for measuring/evaluating the selected characteristics.

It will be appreciated to those skilled in the art that any given specialty chemical might have many uses. The chemical and physical characteristics of interest to a prospective purchaser will therefore depend, to some extent, upon the use that it makes of the specialty chemical. Consequently, the uniform standard (i.e., chemical and physical characteristics and testing methods) for each specialty chemical being sold via data processing system 202 is advantageously developed by the owners/operators of data processing system 202 through discussions with prospective purchasers and suppliers.

Uniform standards that are developed in accordance with the present teachings can be expected, for at least for some specialty chemicals, to comprise more characteristics than the "standards" in the prior art for that specialty chemical. But the present uniform standards are expected to have wide applicability and to be accepted by most prospective purchasers and most suppliers.

The uniform standard for each specialty chemical that is offered for sale over data processing system 202 is advantageously stored in uniform standards database 428. The testing methods used for measuring the chemical and physical characteristics comprising the standard are advantageously stored in uniform standards database 428, as well.

In accordance with some embodiments of the present invention, a specification is established for each specialty chemical. The specification for each specialty chemical that is offered for sale over data processing system 202 is advantageously stored in specifications database 430.

An Illustrative Method in Accordance with the Present Invention

Figure 5:
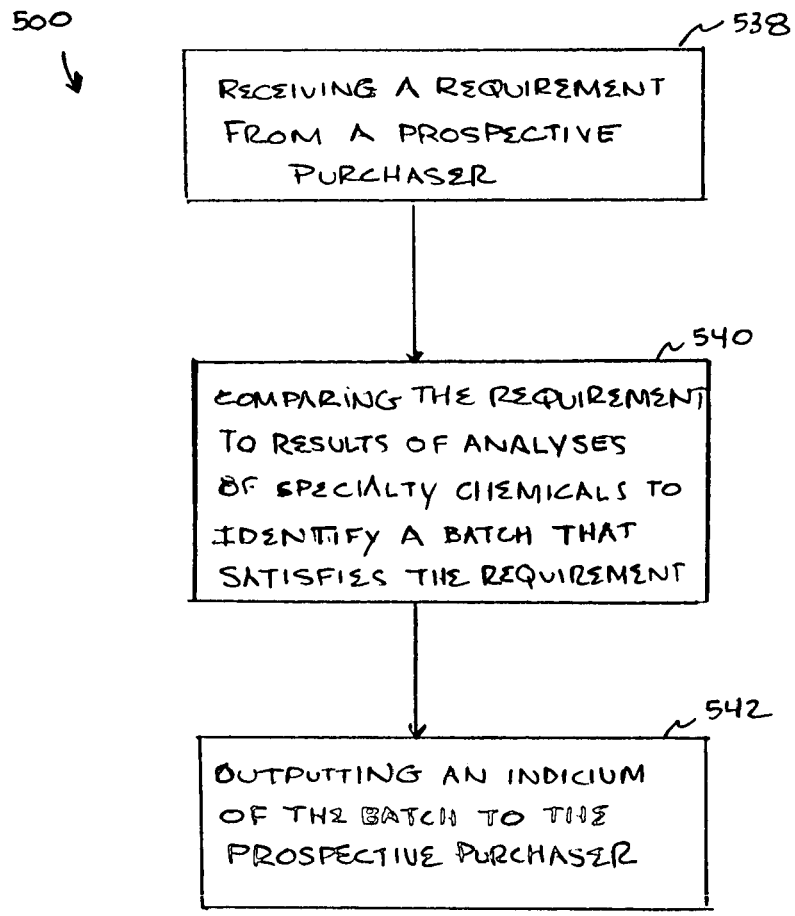
FIG. 5 depicts a flowchart of a first method in accordance with the present invention.

FIG. 5 depicts a flowchart of method 500 in accordance with the illustrated embodiment of the present invention. For pedagogical purposes, method 500 is first described briefly below and then the various operations that comprise the method are described in further detail in conjunction with FIGS. 6 through 9.

In accordance with operation 538 of method 500, a "requirement" is received, by data processing system 202, from a prospective purchaser. As described in more detail later in this disclosure, the requirement indicates, for a specialty chemical of interest, allowed ranges (from a prospective purchaser's point of view) for the measured values of the various chemical and physical characteristics that make up the uniform standard. That is, the analyses of a batch of specialty chemical must fall within the specified ranges to be acceptable for purchase by the prospective purchaser.

In accordance with operation 540, the purchaser-defined requirement is compared to the results of analyses of batches of that specialty chemical that is being offered for sale via data processing system 202. Batches that satisfy the prospective purchaser's requirement are identified. In operation 542, an indicium of the batch(es) satisfying the requirement is output from data processing system 202 to the prospective purchaser.

The various operations comprising method 500 are now described in further detail.

Figure 6:
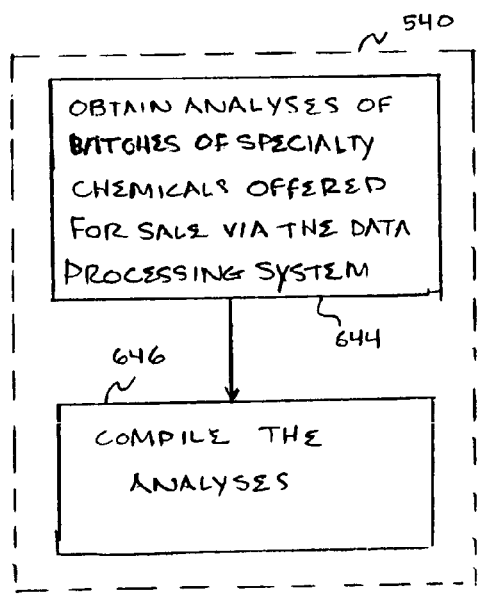
FIG. 6 depicts an illustrative method for carrying out operation 540 of the method depicted in FIG. 5.

In operation 540, the purchaser-defined requirement is compared, by data processing system 202, to the analyses of batches of specialty chemicals to identify a batch that satisfies the requirement. Consequently, to carry out operation 540, such analyses must be obtained and compiled by data processing system 202. As depicted in FIG. 6, these steps—"obtaining analyses" (step 644) and "compiling analyses" (step 646)—comprise a method for carrying out operation 540. Steps 644 and 646 are described in further detail with reference to FIGS. 7 and 8.

In some embodiments of the present invention, analyses of batches are obtained (step 644) by testing sample(s) of specialty chemical(s), typically provided by suppliers thereof, according to a uniform standard established for each particular specialty chemical.

Figure 7:
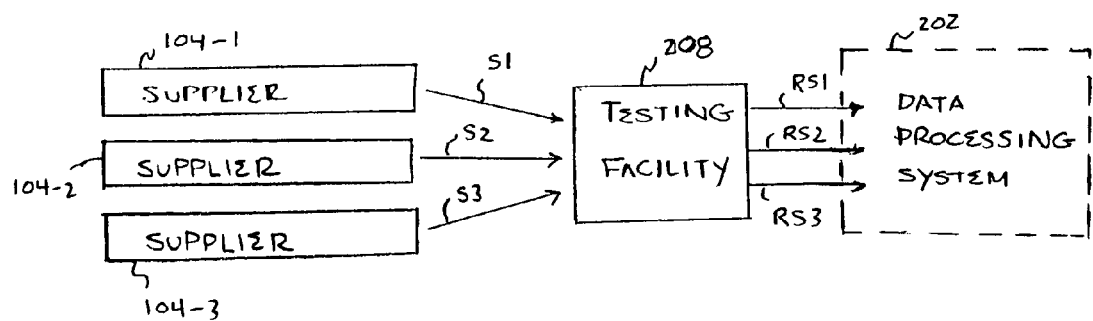
FIG. 7 depicts, via block flow diagram, the method depicted in FIG. 6.

Such testing is depicted in FIG. 7 wherein specialty chemicals supplier 104-1 delivers sample S1 from one of its batches of specialty chemical A to testing facility 208. Similarly, specialty chemicals supplier 104-2 delivers sample S2 from a batch of specialty chemical A to testing facility 208 and specialty chemicals supplier 104-3 delivers sample S3 from one of its batches of specialty chemical A to testing facility 208. It will be understood, of course, that the present method can be practiced with more than the illustrative three specialty chemicals suppliers, with more samples, with more specialty chemicals, and with more than the one testing facility depicted in FIG. 7.

Each of samples S1, S2 and S3 is tested by testing facility 208 in accordance with the uniform standard established for specialty chemical A. In other words, measurements are taken for each of samples S1, S2 and S3 to determine a value for each of the chemical and physical characteristics that are included in the uniform standard for specialty chemical A. The chemical and physical characteristics are measured using the particular testing methods specified by the uniform standard.

Using the uniform standard, in accordance with the present teachings, as the basis for testing, the samples (each representative of a batch of specialty chemical A from one of the three suppliers) can truly be compared by a prospective purchaser on an "apples-to-apples" basis.

Referring to FIG. 6, according to step 646, the analyses of each batch of specialty chemical being offered for sale via data processing system 202 is compiled in data processing system 202. This operation is illustrated in FIG. 7, wherein the sample analyses are depicted as being in the form of three signals that are input into data processing system 202. More particularly, signal RS1 carries information indicative of the analyses for sample S1, signal RS2 carries information indicative of the analyses for sample S2, signal RS3 carries information indicative of the analyses for sample S3. As previously described, such signals can be generated, for example, by the test equipment that performs the analyses of samples.

Figure 8:
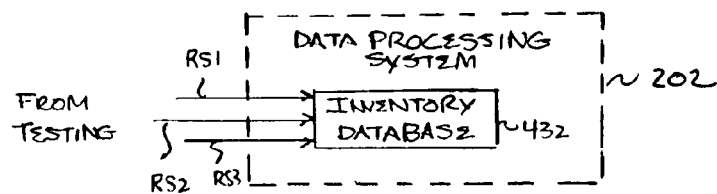
FIG. 8 depicts analyses of specialty chemicals offered for sale over the data processing system being stored in an inventory database.

As depicted in FIG. 8, in some embodiments of the present invention, the analyses are advantageously organized into inventory database 432, in known fashion.

As additional batches of specialty chemicals become available for sale over data processing system 202, a sample of each such batch is provided to testing facility 208 for testing in accordance with the uniform standard for that particular specialty chemical. As described above, the analyses are compiled, such as in inventory database 432. In this manner, inventory database 432 is updated as additional batches of specialty chemicals become available for purchase through data processing system 202.

Operations 538 and 540 involve a "requirement" that is specified by a prospective purchaser concerning a particular specialty chemical that it wishes to buy. In operation 538, the requirement is received by the data processing system, and in operation 540, the requirement is compared to the analyses of the specialty chemicals available for purchase.

As described below, this "requirement" is analogous to the previously described "specification." The difference is that a prospective purchaser defines the requirement, while a supplier, at least traditionally, defines the specification. In accordance with the present teachings, the prospective purchaser defines the requirement in one of several ways.

For example, in one embodiment of the present invention, the prospective purchaser is presented (by data processing system 202) with a list of chemical and physical characteristics and testing methods for a particular specialty chemical that it wishes to buy. The prospective purchaser defines, for at least some of the chemical and physical characteristics (i.e., those considered to be important), a range of acceptable values. That is, a minimum value and maximum value are advantageously listed for at least some chemical and physical characteristics.

Thus, the term "requirement" refers, in this embodiment, to the aforementioned prospective-purchaser defined range of acceptable values for at least a part of the set of chemical and physical characteristics comprising the uniform standard for a particular specialty chemical. This embodiment is depicted, figuratively, in FIG. 9 at block 950 wherein prospective purchaser 106-1 has access to uniform standards database 428.

Rather than defining its own requirement "from scratch" as in the above-described embodiment, a prospective purchaser might prefer to use a specification that has been previously established for the specialty chemical that it wishes to buy. This is depicted, figuratively, in FIG. 9 at block 950, wherein prospective purchaser 106-1 has access to specifications database 430.

The established specification can be the specification developed for the particular specialty chemical by the owner/operator of data processing system 202. Or, based on a past sales relationship with a specific supplier, a prospective purchaser might wish to use that supplier's specification for the particular specialty chemical that it wants to buy. Thus, the established specification can alternatively be the specification developed for the particular specialty chemical by any of the suppliers patronizing the system.

To the extent that a supplier's specification applies to chemical and physical characteristics or testing methods that are different than those comprising the uniform standard, such a specification, or certain entries in the specification, cannot be used. Specifications from suppliers are advantageously stored in specifications database 430.

Typically, a prospective purchaser's requirement for a particular specialty chemical will not change with repeated purchases. Consequently, in some embodiments of the present invention, the prospective purchaser 106-1 advantageously stores its requirement for a particular specialty chemical in requirements database 434. For subsequent purchases of the same specialty chemical, the prospective purchaser simply references its archived requirement. This is figuratively depicted in FIG. 9 at block 950, wherein the prospective purchaser has access to requirements database 434.

As used herein, the term "requirement" or "defining a requirement" encompasses all of the above-described embodiments (i.e., specifying a range for some or all of the characteristics in the uniform standard, referencing a specification stored in specifications database 430 and referencing a requirement stored in requirements database 434).

Referring now to FIG. 5, operation 540 requires comparing the requirement to the analyses. In one embodiment in accordance with the present teachings, the comparison operation involves searching inventory database 432 for batches of the specialty chemical of interest that meet or satisfy the requirement. As used herein the phrase "satisfy the requirement" or "satisfies the requirement" means that the measured values for the various physical and chemical characteristics (i.e., the analyses of a batch) fall within the nominal ranges for such values as specified in the requirement. Operation 540 is depicted, figuratively, in FIG. 9 at block 952.

In accordance with operation 542, the prospective purchaser is notified of the results of comparison operation 540. The analyses of the batch or batches meeting the requirement are advantageously provided to the prospective purchaser. In some embodiments of the invention, an indicium that uniquely identifies (e.g., via a code, etc.) each selected batch of specialty chemical is provided to the prospective purchaser. In some embodiments of the present invention, the indicium does not otherwise provide any identifying information about the batch (e.g., the identity of the supplier, the brand name of the product, etc.) to the prospective purchaser. The notification operation is figuratively depicted in FIG. 9 by signal 954 that is routed to prospective purchaser 106-1.

It will be appreciated that the requirement defined by a prospective purchaser may include a substantial list of chemical and physical characteristics. Consequently, it is anticipated that, at least in some instances, all batches of the specialty chemical of interest in inventory may be out of range (i.e., not meet the requirement) for at least some of the characteristics. To that end, in some embodiments in accordance with the present teachings, the prospective purchaser can assign a priority to each chemical and physical characteristic.

For example, in some embodiments, if a relatively "higher" priority is assigned to certain chemical and physical characteristics, the requirement for those characteristics must be met for a batch of the specialty chemical in inventory to be considered acceptable for purchase. On the other hand, if a batch of specialty chemical does not satisfy the requirement for several characteristics that are assigned a relatively "lower" priority, the batch may still be considered to be acceptable (i.e., meeting the requirement). As a consequence, batches of a specialty chemical of interest that would otherwise not pass muster are brought to the attention of a prospective purchaser. In this manner, among others, data processing system 102 facilitates the sale of specialty chemicals. Those skilled in the art are readily able to assign such priorities as a function of the intended application for the specialty chemical.

Apprised by data processing system 202 of suitable batches of a specialty chemical, the prospective purchaser can choose to purchase one or more of the batches. A purchase is made via data processing system 202 using telephone, e-mail, etc. This operation is figuratively depicted in FIG. 9 wherein signal 956 is sent to data processing system 202.

Data processing system 202 advantageously compiles statistics concerning activity within the data processing system. The statistics might include, but are not limited to:
  The amount of a particular specialty chemical that is purchased by a specific purchaser;
  The relative sales volumes of the various specialty chemicals being sold over the data processing system;
  The requirement defined for specific specialty chemicals by prospective purchasers; and
  Time sensitive or perishable information concerning when a purchase of a particular specialty chemical occurs.

Regarding time sensitive or perishable information, the purchasing activity of a patron of data processing system 202 might be indicative, in some cases, of additional specialty chemicals that it may soon purchase.

For example, assume that the manufacture of product X requires specialty chemicals A, B, C, D and E. Also assume that, as a function of the manufacturing process, specialty chemicals A and B are obtained and used first, specialty chemicals C and D are obtained and used second, and specialty chemical E is obtained and used last.

Consequently, when a patron of data processing system 202 has ordered specialty chemicals A and B, it is known to a high degree of certainty that the patron is manufacturing product X and might place an order for chemicals C, D and E in the near future. To a supplier that produces any of the specialty chemicals C, D and E, knowledge of the purchase of chemicals A and B and when such purchase occurred, might be very valuable.

It will be clear to those skilled in the art how to compile such statistics, which, in some embodiments, are stored in statistics database 436. The statistics are advantageously re-compiled each time a new sale is made. The operation of compiling statistics is depicted, figuratively, in FIG. 9 by signal 958 (i.e., delivering purchasing/sales information to statistics database) and by signal 960 (i.e., delivering requirements information to statistics database).

Figure 9:
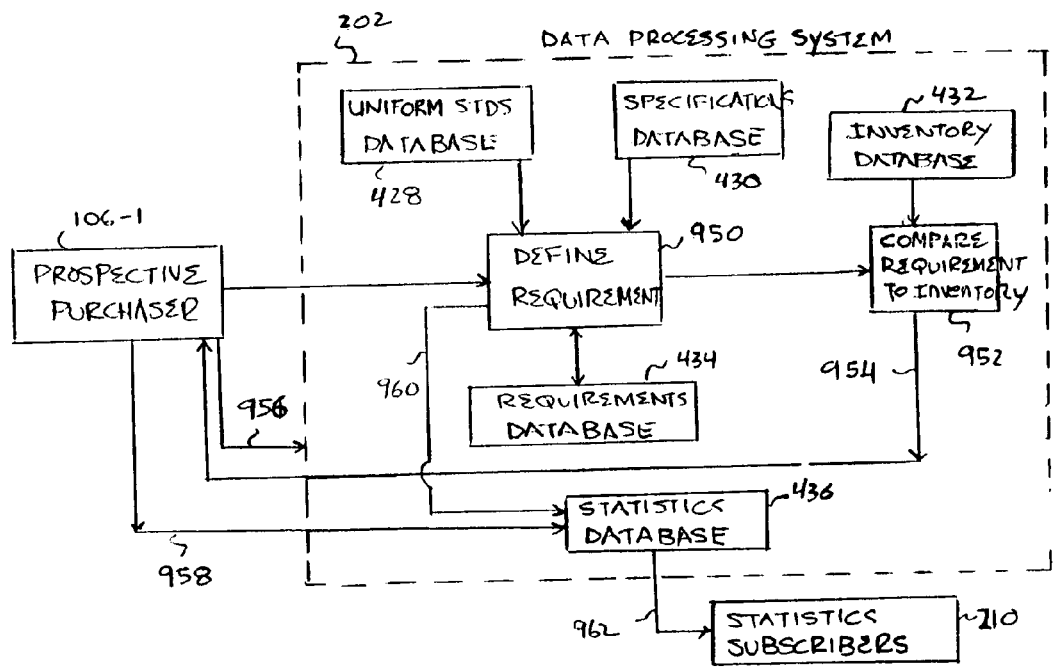
FIG. 9 depicts, via block flow diagram, a prospective purchaser defining a requirement for a specialty chemical that it wishes to buy, and further depicts operation 540 and 542 of the method depicted in FIG. 8, and further depicts the compiling of statistics and the disbursement of such statistics to statistics subscribers.

Because the statistics compiled in statistics database 436 are valuable (i.e., to specialty chemicals suppliers, among others) they can be sold. FIG. 9 depicts the disbursement of statistics, via signal 962, to statistics subscribers 210 on any basis desired (e.g., in exchange for money, as incentive to patronize data processing system 202, etc.).

Among the many benefits that the present invention provides is the ability for a supplier to offer a non-branded product. As discussed in the Summary section, selling a non-branded product via conventional sales channels is somewhat problematic. In particular, to what standard and specification does the supplier reference its unbranded product? In accordance with the present teachings, analyses of all batches of specialty chemicals that are offered for sale through data processing system 202 are advantageously referenced to the applicable uniform standard, thereby circumventing this problem.

A method for selling non-branded product in accordance with the present invention is consistent with the methods already described. In particular, such a method comprises:
  receiving a sample of a batch of a first specialty chemical that is to be sold at a reduced price through a data processing system;
  analyzing the sample according to an applicable uniform standard of chemical and physical characteristics and methods;
  inputting the analyses into the data processing system;
  receiving, at the data processing system, a requirement for the first specialty chemical from a prospective purchaser; and
  outputting, from the data processing system, an indicium of the batch and the reduced selling price to a prospective purchaser if the analyses of the batch satisfies the requirement established by the prospective purchaser.

It is to be understood that the above-described embodiments are merely illustrative of the invention and that many variations can be devised by those skilled in the art without departing from the scope of the following claims and their equivalents.

What is claimed is:

1. A method comprising:
receiving, at a data processing system, a requirement from a prospective purchaser for a first chemical, wherein the requirement is based on a uniform standard for said first chemical;
comparing, by a computer in said data processing system, said requirement to analyses of batches of said first chemical that are available for purchase from at least two different suppliers through said data processing system to identify a batch that satisfies said requirement, wherein said analyses are obtained from a testing facility that tests samples of said batches in accordance with said uniform standard for said first chemical, and further wherein each batch that is available for purchase is analyzed by said testing facility; and
outputting, from said data processing system, an indicium of said identified batch to said prospective purchaser;
wherein said data processing system comprises said computer, and further comprises a data storage device that stores said uniform standard for the first chemical and said analyses.

2. The method of claim 1 further comprising:
compiling statistics in said data processing system, said statistics comprising information about purchases of said first chemical and purchases of other chemicals facilitated by said data processing system; and
outputting said statistics to a statistics subscriber.

3. The method of claim 1 wherein said identified batch of said first chemical is priced below a price at which said first chemical is normally sold.

4. The method of claim 1 wherein said uniform standard is developed by owners/operators of said data processing system.

5. The method of claim 1 wherein said indicium does not provide any information selected from the group consisting of a supplier of said identified batch and a brand name of said first chemical in said identified batch.

6. The method of claim 1 comprising storing said analyses in an inventory database residing in said data storage device.

7. The method of claim 6 comprising:
obtaining further analyses of further batches of said first chemical, wherein said further batches are analyzed in accordance with said uniform standard established for said first chemical; and
updating said inventory database by inputting said further analyses into said inventory database.

8. The method of claim 6 comprising:
obtaining analyses of batches of a second chemical, wherein said batches are analyzed in accordance with a uniform standard established for said second chemical; and
updating said inventory database by inputting said analyses of batches of said second chemical into said inventory database.

9. The method of claim 1 comprising storing said requirement in a requirements database.

10. The method of claim 1 wherein said requirement comprises an allowable range of values for at least some of said physical and chemical characteristics that define said uniform standard, the method further comprising assigning a rank to at least one of said physical characteristics or chemical characteristics, wherein a value of said rank indicates a relative importance of satisfying said one physical characteristic or chemical characteristic in determining whether or not a batch satisfies said requirement.

11. A method comprising:
offering to a prospective purchaser, by a data processing system, a uniform standard for a chemical, said uniform standard being defined by a supplier-independent set of physical and chemical characteristics of said chemical;
receiving, at said data processing system, a requirement from the prospective purchaser for said chemical, wherein said requirement comprises an allowable range of values for at least some of said physical and chemical characteristics that define said uniform standard, and wherein said chemical is available for purchase via said data processing system; and
comparing based on said uniform standard, by a computer in said data processing system, said requirement to analyses of a plurality of batches of said chemical that are available for purchase through said data processing system, wherein each batch that is available for purchase is analyzed by said testing facility, and further wherein said analyses are stored in said data storage device;
wherein said data processing system comprises said data storage device, said computer, a first network interface to said prospective purchaser, and a second network interface to said testing facility.

12. The method of claim 11 further comprising storing said requirement in said data processing system.

13. The method of claim 11 further comprising outputting, from said data processing system, an indicium of at least one batch of said chemical, of said plurality thereof, that satisfies said requirement.

14. The method of claim 13 wherein said indicium does not provide any information selected from the group consisting of a supplier of said one batch and a brand name of said first chemical in said one batch.

15. The method of claim 11 further comprising:
compiling statistics in said data processing system, said statistics comprising information about purchases of said chemical facilitated by said data processing system;
storing said statistics in said data storage device; and
outputting said statistics to an interested party.

16. The method of claim 15 wherein said requirement comprises a range of acceptable values for at least some of a plurality of characteristics that define said uniform standard, the method further comprising assigning a rank to at least one of said characteristics, wherein a value of said rank indicates a relative importance of satisfying said one characteristic in determining whether or not a batch satisfies said requirement.

17. A method comprising:
receiving, at a data processing system, a requirement from a prospective purchaser for a first chemical, wherein said requirement is based on a uniform standard for said first chemical, and further wherein said uniform standard is stored in a data storage device;
comparing, by a computer in said data processing system, said requirement to analyses of batches of said first chemical that are available for purchase through said data processing system to identify a batch that satisfies said requirement, wherein said analyses are obtained from a testing facility that tests samples of said batches in accordance said uniform standard for said first chemical, and wherein each batch that is available for purchase is analyzed by said testing facility;

wherein said data processing system comprises said data storage device, said computer, a first network interface to said prospective purchaser, and a second network interface for obtaining said analyses from said testing facility.

18. The method of claim 17 further comprising outputting, from said data processing system, an indicium of said identified batch to said prospective purchaser, wherein said indicium does not provide any information selected from the group consisting of a supplier of said identified batch and a brand name of said first chemical in said identified batch.

19. The method of claim 17 further comprising:

obtaining analyses of additional batches of said first chemical, wherein said additional batches are analyzed in accordance with said uniform standard established for said first chemical; and updating an inventory database by inputting said additional analyses into said inventory database.

\* \* \* \* \*